(12) United States Patent
Walters et al.

(10) Patent No.: US 9,798,813 B2
(45) Date of Patent: Oct. 24, 2017

(54) EXTENSIBLE PERSON CONTAINER

(71) Applicant: salesforce.com, inc., San Francisco, CA (US)

(72) Inventors: Jeanine Walters, San Francisco, CA (US); Blake Whitlow Markham, Oakland, CA (US); Aditya Sesha Kuruganti, Los Altos, CA (US); Joseph Ryan, San Francisco, CA (US); Steven Tamm, San Francisco, CA (US); Jason Winters, San Francisco, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 403 days.

(21) Appl. No.: 14/335,024

(22) Filed: Jul. 18, 2014

(65) Prior Publication Data
US 2015/0039600 A1    Feb. 5, 2015

Related U.S. Application Data

(60) Provisional application No. 61/860,501, filed on Jul. 31, 2013.

(51) Int. Cl.
| | | |
|---|---|---|
| *G06F 17/30* | (2006.01) | |
| *G06Q 50/00* | (2012.01) | |
| *G06Q 10/06* | (2012.01) | |
| *G06Q 30/00* | (2012.01) | |

(52) U.S. Cl.
CPC ....... *G06F 17/30867* (2013.01); *G06Q 10/06* (2013.01); *G06Q 30/016* (2013.01); *G06Q 50/01* (2013.01)

(58) Field of Classification Search
CPC .............. G06Q 50/01; G06Q 30/016; G06F 17/30867
USPC ............................................... 707/725
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

*Primary Examiner* — Kris Mackes
*Assistant Examiner* — Tiffany Thuy Bui
(74) *Attorney, Agent, or Firm* — Haynes Beffel & Wolfeld LLP; Ernest J. Beffel, Jr.

(57) ABSTRACT

The technology disclosed relates to representing users in different contexts within customer relationship management (CRM) environments. In particular, it relates to creating a person object model for each user in the CRM environment by linking a plurality of user records in the CRM environment that is separately created by different organizations and departments. The person object model also incorporates online social identities of the users, according to one implementation. This inclusive linked model provides a comprehensive view of the users to handlers of the CRM environment, thus facilitating an enhanced overall CRM experience.

20 Claims, 11 Drawing Sheets

Flowchart of Linking Person Records

(56) References Cited

U.S. PATENT DOCUMENTS

| | | | |
|---|---|---|---|
| 6,049,776 A * | 4/2000 | Donnelly | G06Q 10/06311 705/320 |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,069,497 B1 | 6/2006 | Desai | |
| 7,181,758 B1 | 2/2007 | Chan | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,603,483 B2 | 10/2009 | Psounis et al. | |
| 7,620,655 B2 | 11/2009 | Larsson et al. | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 * | 2/2014 | Jakobson | H04L 63/0407 726/29 |
| 8,756,275 B2 | 6/2014 | Jakobson | |
| 8,769,004 B2 | 7/2014 | Jakobson | |
| 8,769,017 B2 | 7/2014 | Jakobson | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0021019 A1 | 1/2006 | Hinton et al. | |
| 2006/0047558 A1 * | 3/2006 | Uchiyama | G06Q 10/00 705/7.16 |
| 2007/0192122 A1 * | 8/2007 | Routson | G06F 17/30292 705/1.1 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0088270 A1 * | 4/2010 | Ziegler | G06F 17/30309 707/609 |
| 2011/0218958 A1 | 9/2011 | Warshavsky et al. | |
| 2011/0247051 A1 | 10/2011 | Bulumulla et al. | |
| 2011/0320230 A1 * | 12/2011 | Podgurny | G06Q 10/06 705/7.13 |
| 2012/0042218 A1 | 2/2012 | Cinarkaya et al. | |
| 2012/0233137 A1 | 9/2012 | Jakobson et al. | |
| 2012/0290407 A1 | 11/2012 | Hubbard et al. | |
| 2013/0019235 A1 | 1/2013 | Tamm | |

(56) References Cited

U.S. PATENT DOCUMENTS

| | | |
|---|---|---|
| 2013/0212497 A1 | 8/2013 | Zelenko et al. |
| 2013/0239170 A1 | 9/2013 | Ziemann et al. |
| 2013/0247216 A1 | 9/2013 | Cinarkaya et al. |
| 2014/0074928 A1* | 3/2014 | B'Far .................. H04L 67/306 709/204 |
| 2014/0081913 A1 | 3/2014 | Peri et al. |
| 2014/0115004 A1 | 4/2014 | Isaacs et al. |
| 2014/0201835 A1* | 7/2014 | Emigh ................... G06F 21/55 726/23 |
| 2016/0055182 A1* | 2/2016 | Petrou .............. G06F 17/30256 707/734 |

\* cited by examiner

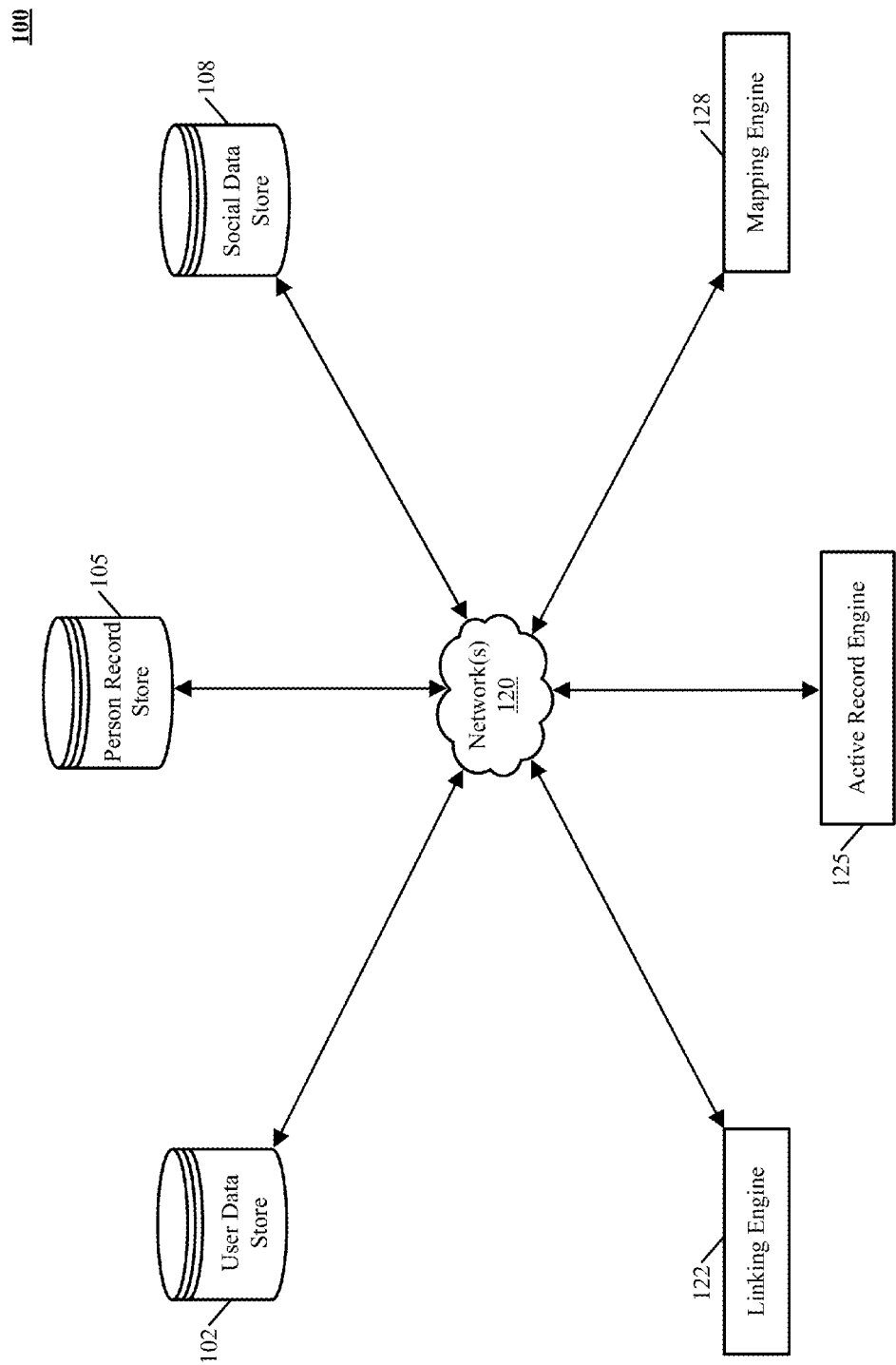
FIG. 1 – Linking Environment

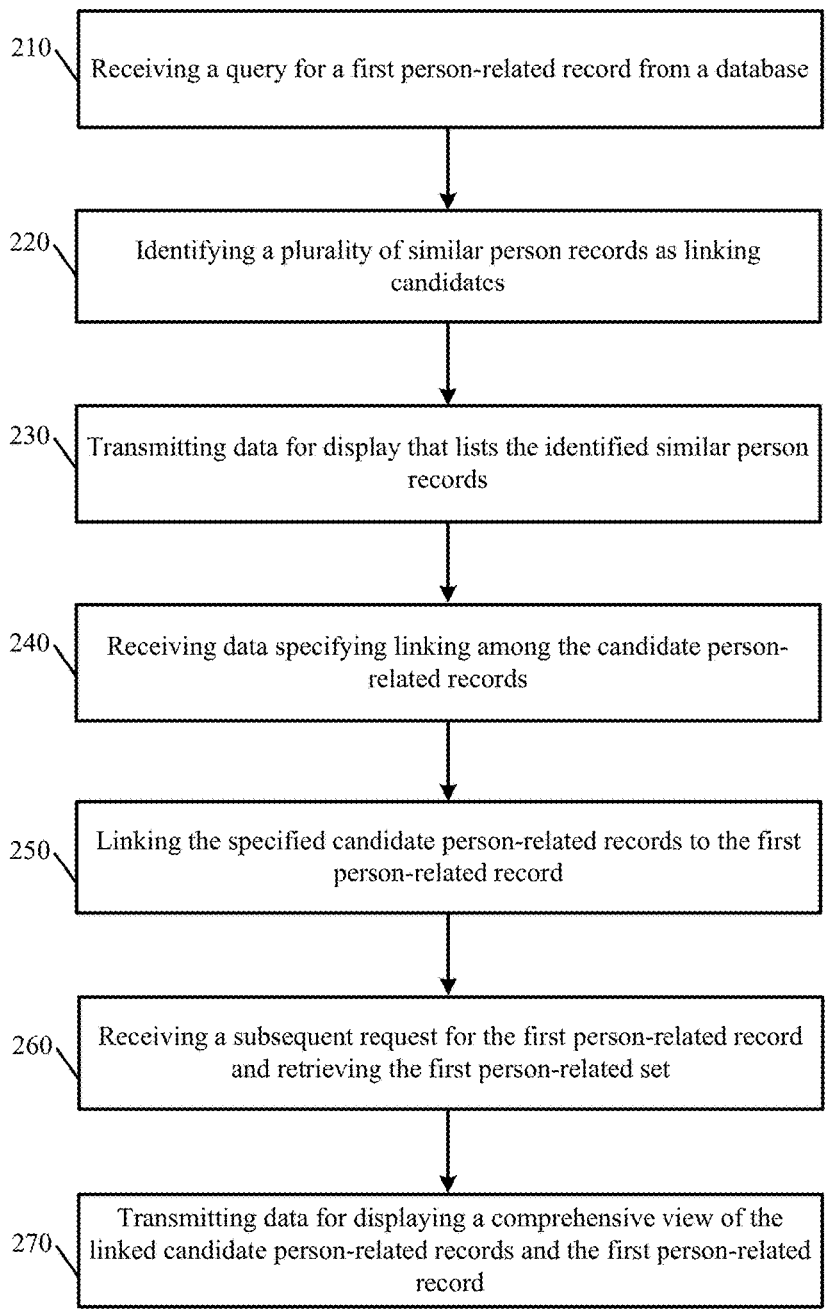
FIG. 2 – Flowchart of Linking Person Records

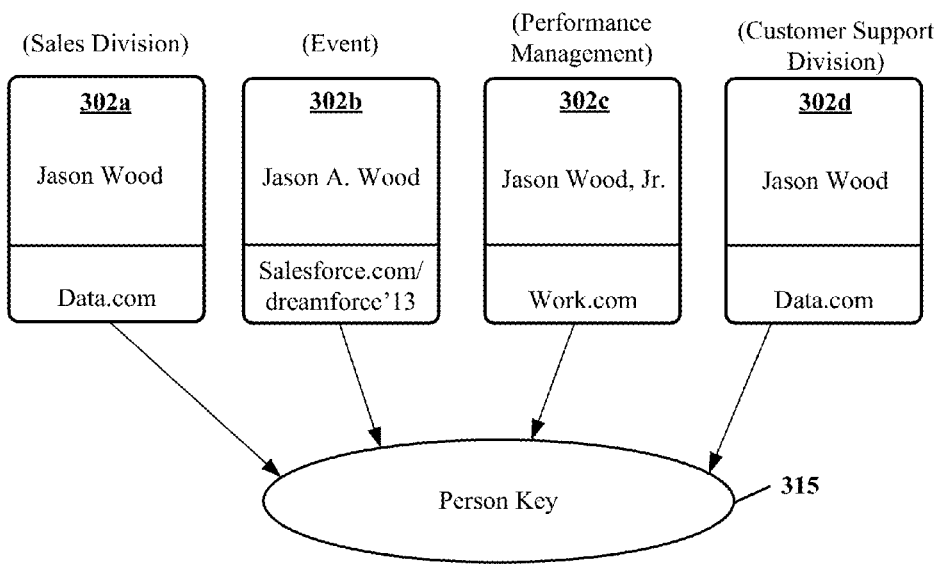
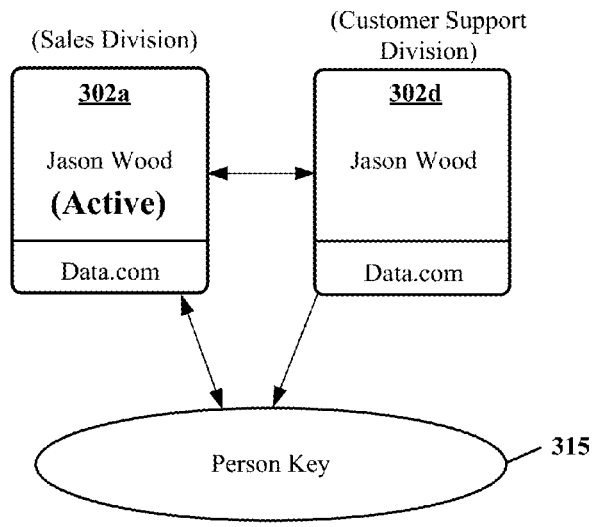
FIG. 3 – Linking Person Records

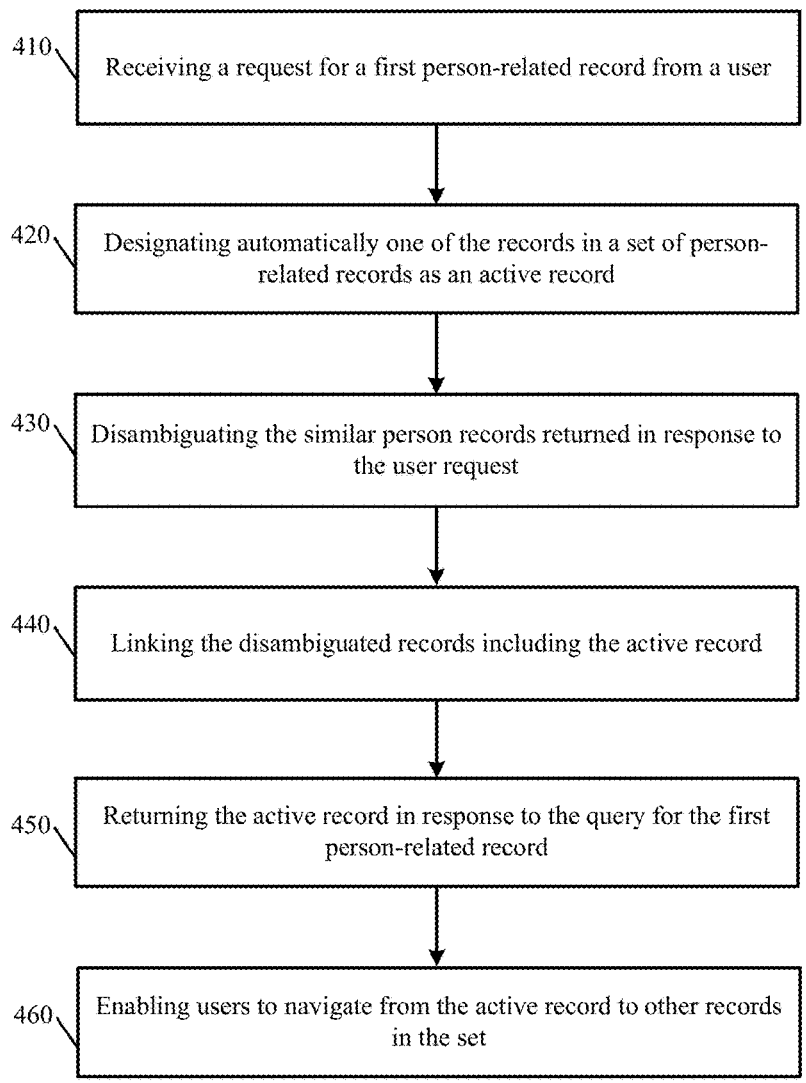
FIG. 4 – Flowchart of Linking Person Records Including an Active Record

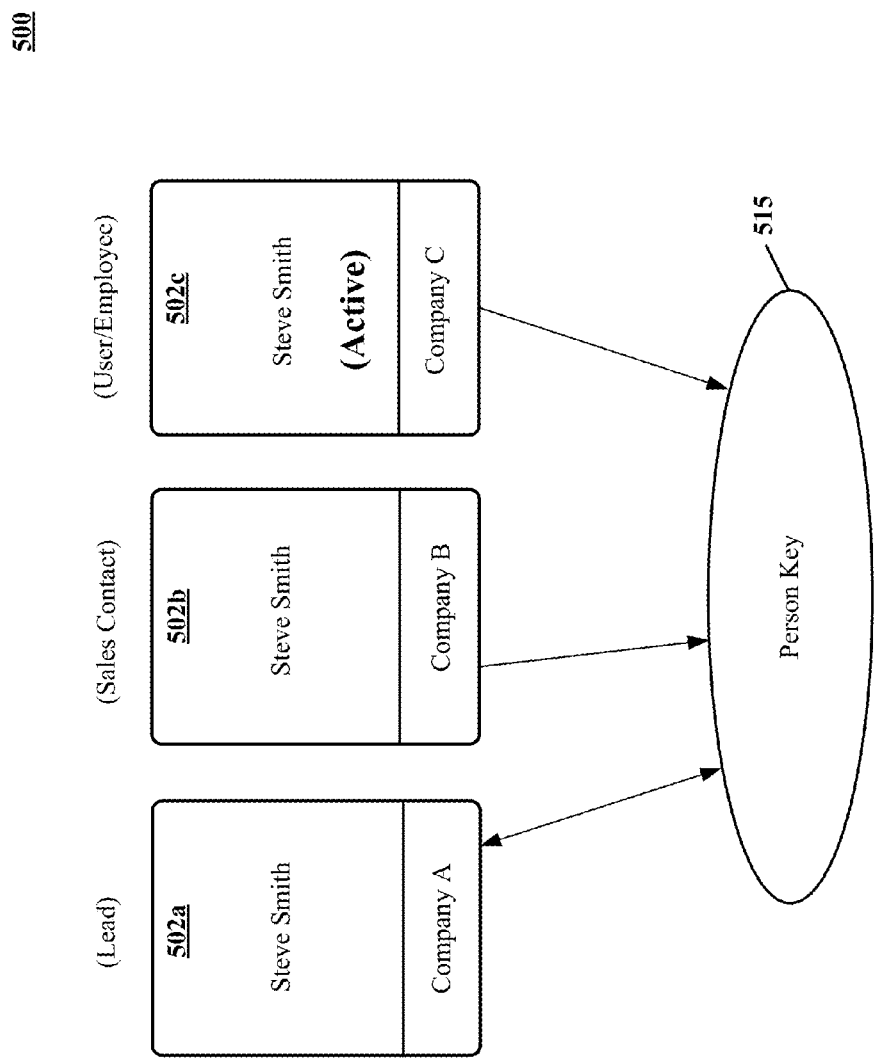
FIG. 5 – Life Cycle Management Linking Person Records

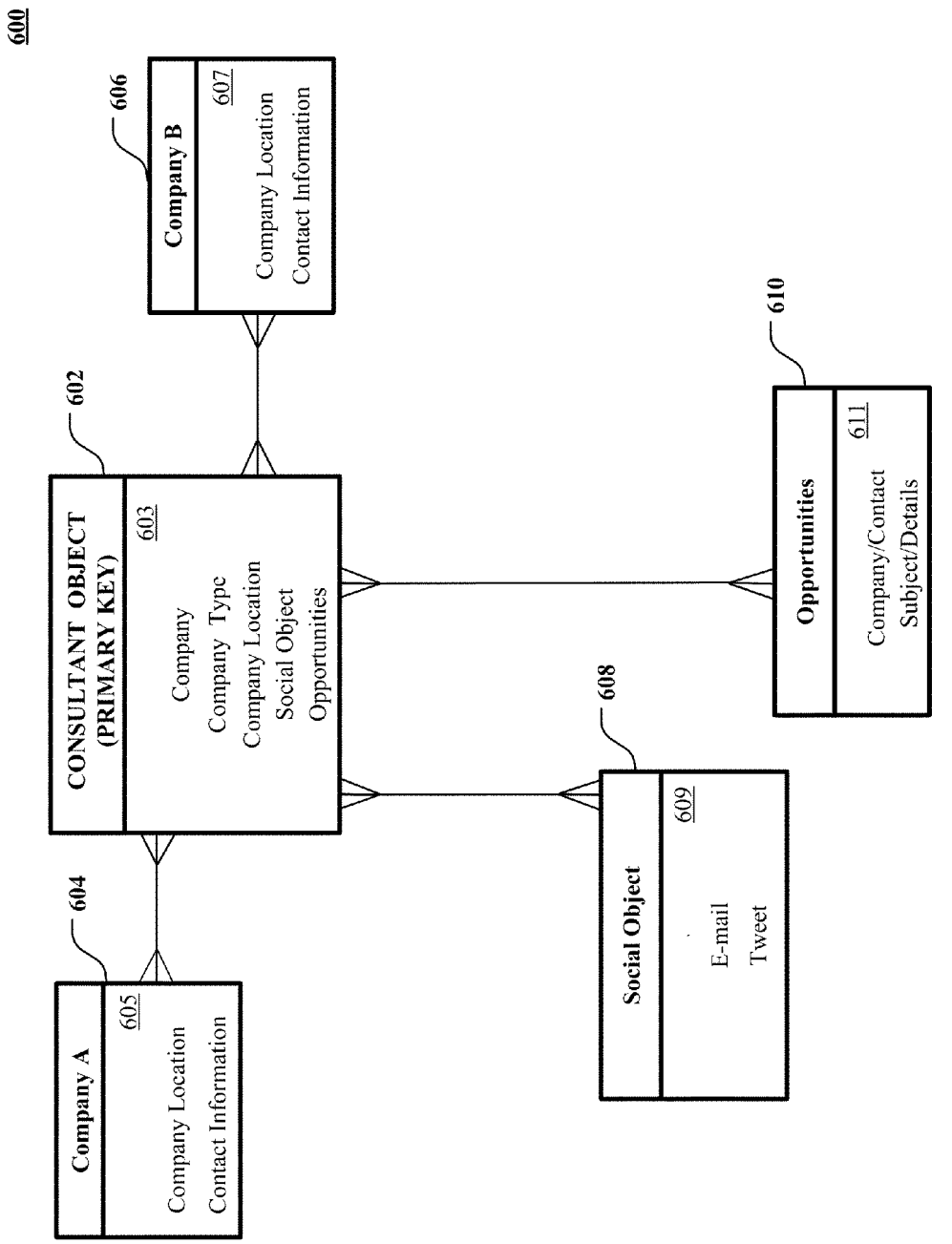

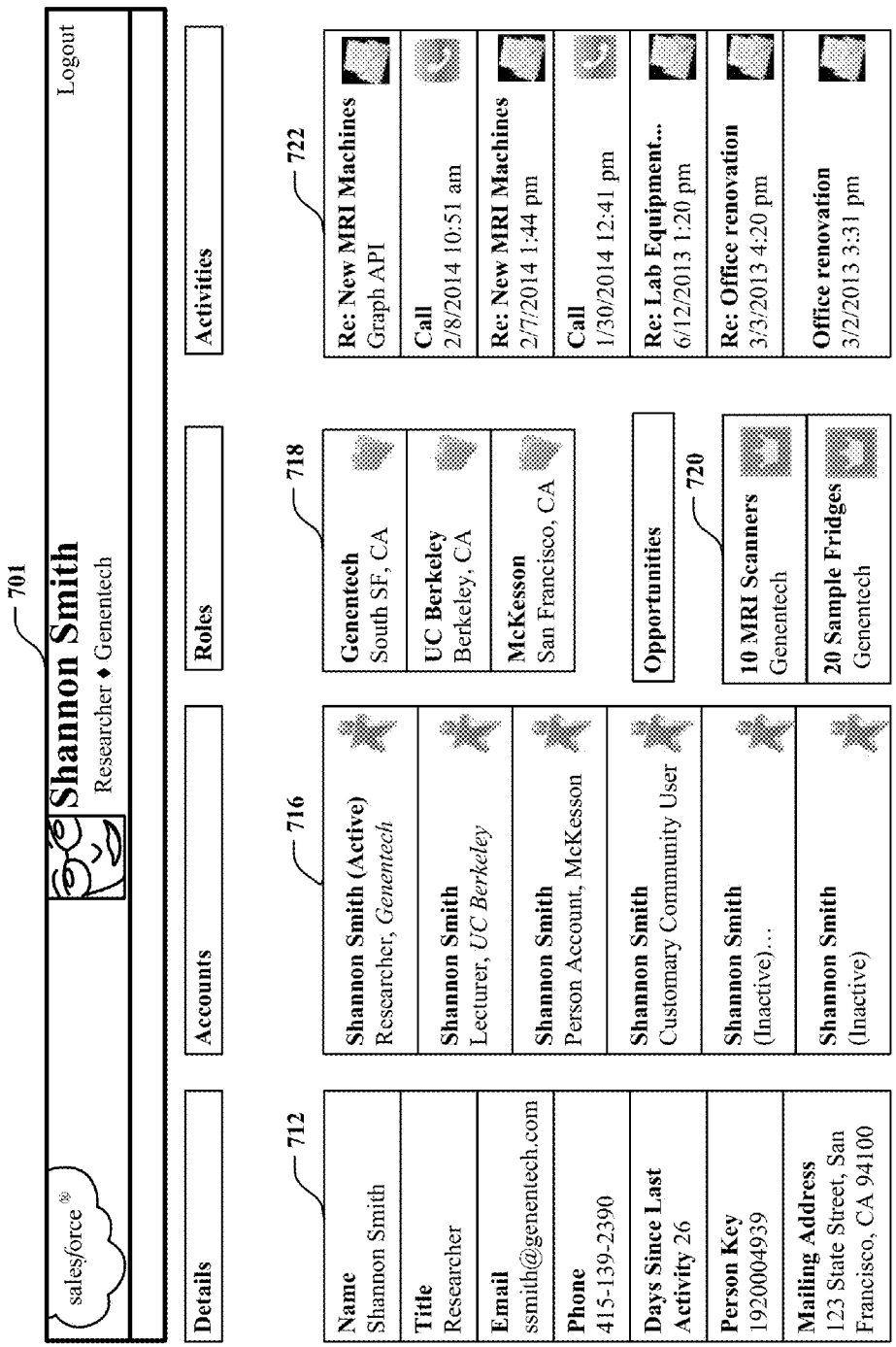
FIG. 7 – Consultant Records – Table View

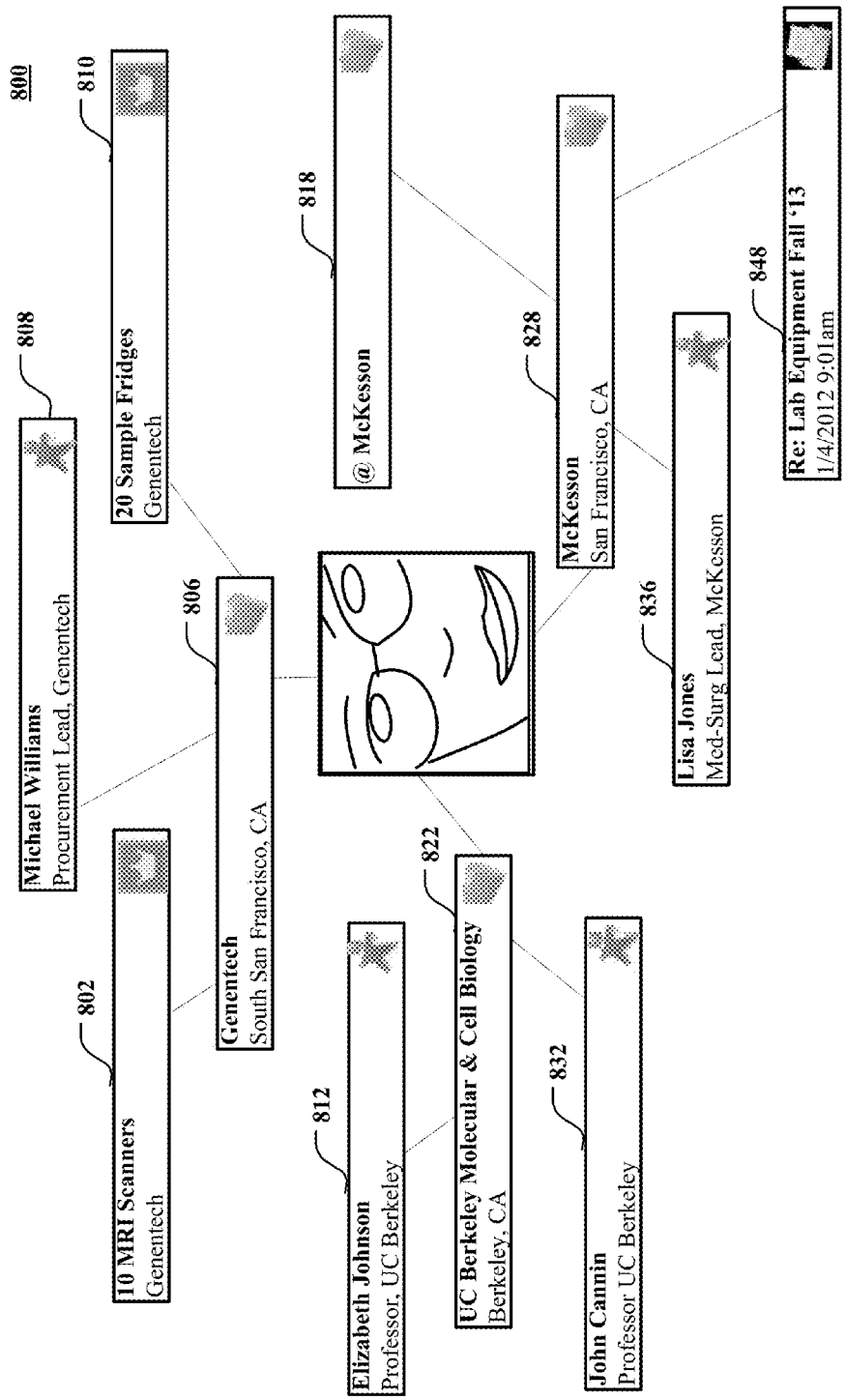
FIG. 8 – Consultant Records – Aggregate View

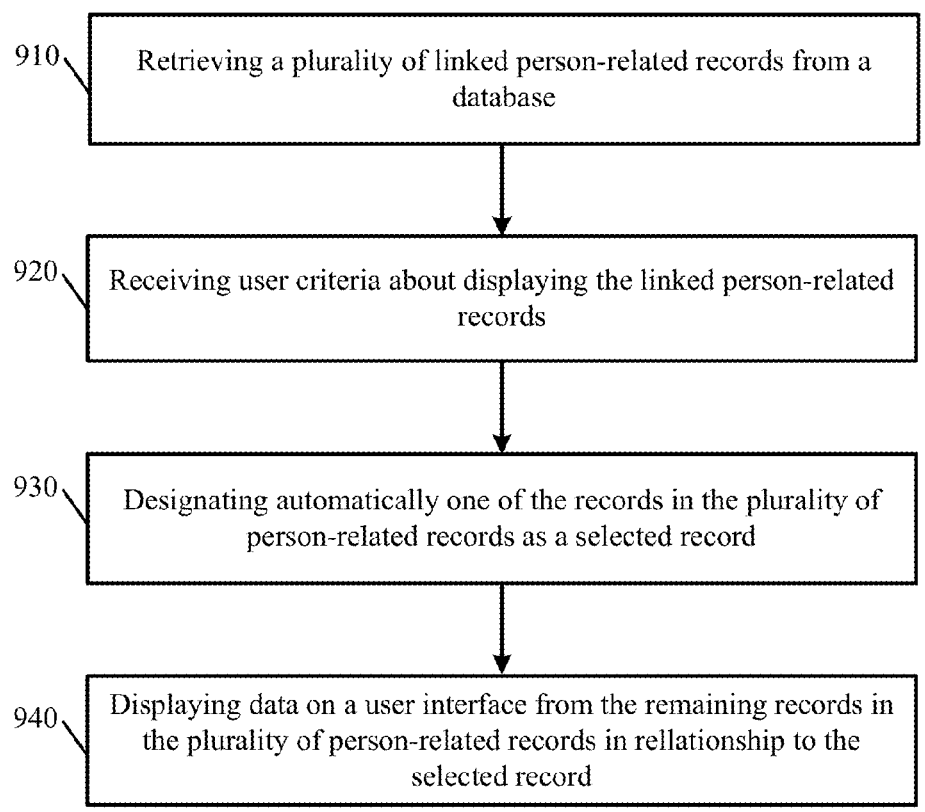
FIG. 9 – Flowchart of Organizing Linked Person Records

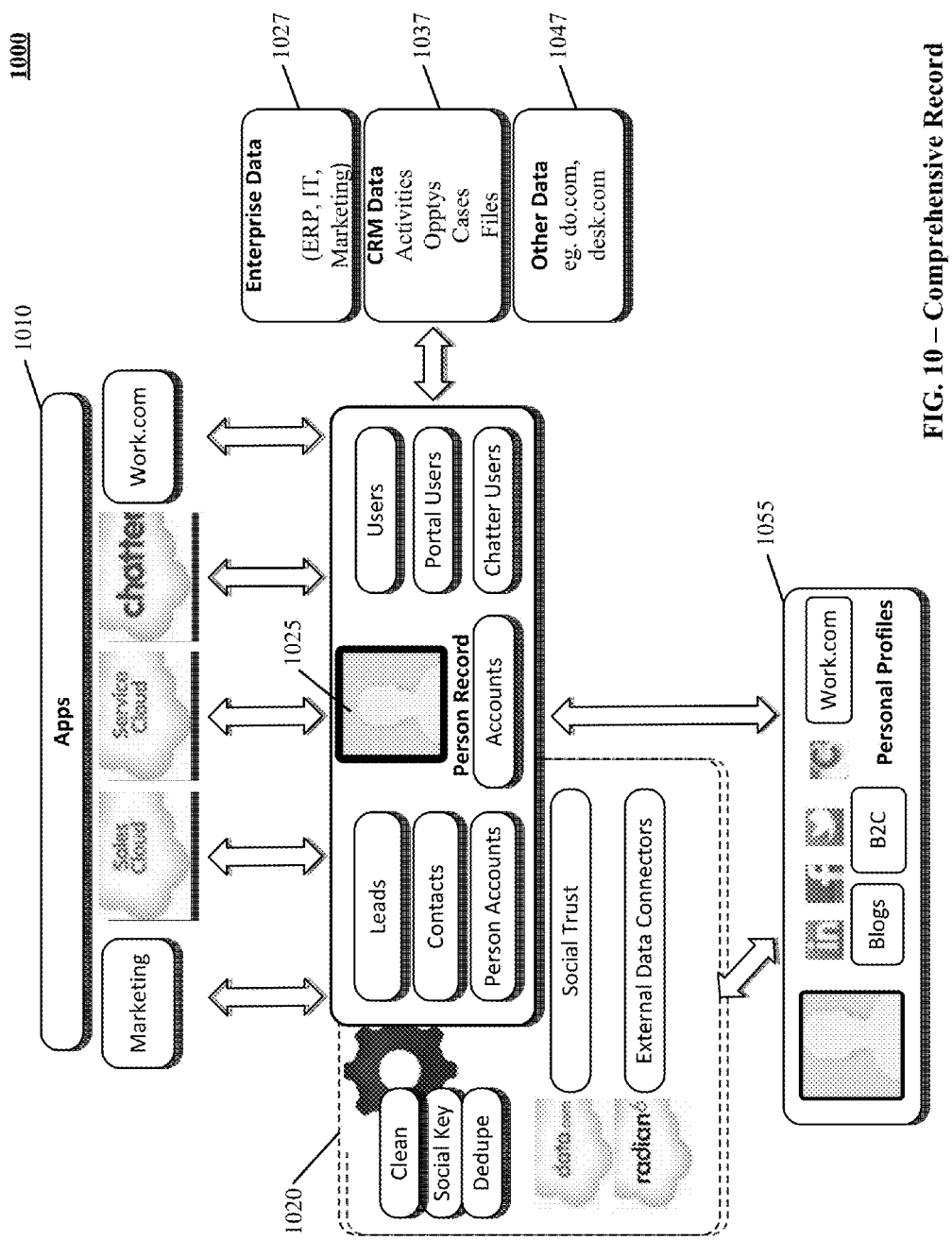
FIG. 10 – Comprehensive Record

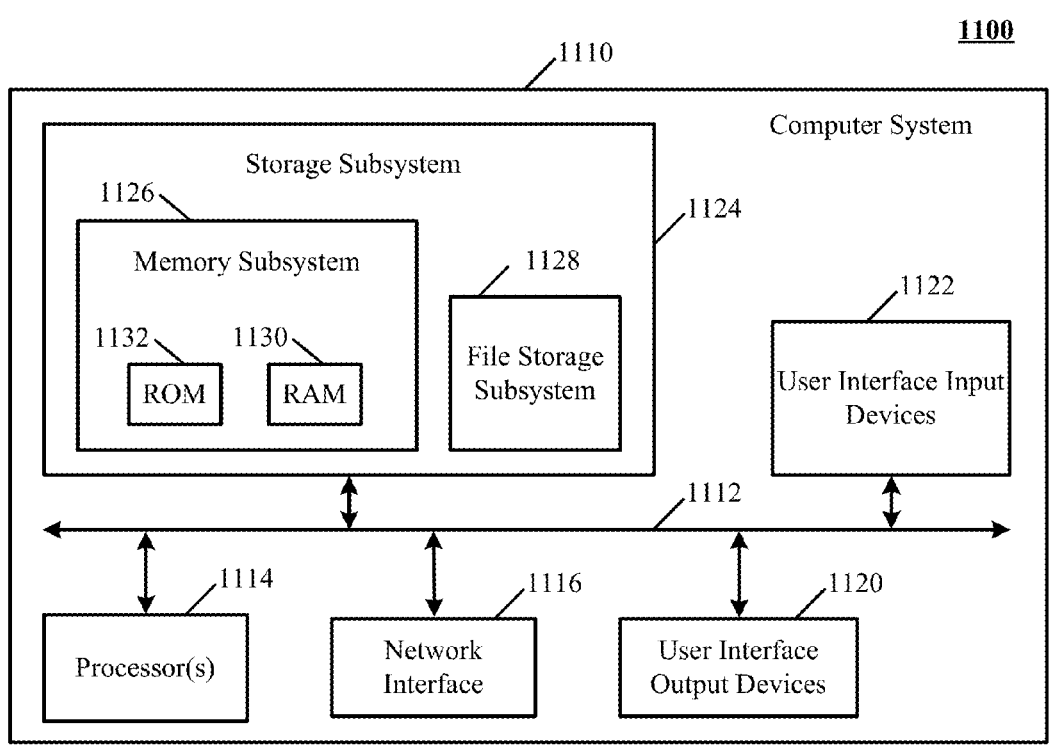
FIG. 11 – Computer System

# EXTENSIBLE PERSON CONTAINER

RELATED APPLICATION

The application claims the benefit of U.S. Provisional Patent Application No. 61/860,501, filed on 31 Jul. 2013. The provisional application is hereby incorporated by reference for all purposes.

INCORPORATIONS

Materials incorporated by reference in this filing include the following:

"SYSTEM AND METHOD FOR ENHANCING TRUST FOR PERSON-RELATED DATA", U.S. application Ser. No. 13/791,295, filed 8 Mar. 2013, "SYSTEM AND METHOD OF ENRICHING CRM DATA WITH SOCIAL DATA", U.S. application Ser. No. 14/028,277, filed 16 Sep. 2013, and "SYSTEM AND METHOD OF AUDIT TRAILING OF DATA INCORPORATION", U.S. application Ser. No. 14/145,735, filed 31 Dec. 2013.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves can also correspond to implementations of the claimed inventions.

The technology disclosed relates to representing users in different contexts within customer relationship management (CRM) environments. In particular, it relates to creating a person object model for each user in the CRM environment by linking a plurality of user records in the CRM environment that is separately created by different organizations and departments.

Existing CRM solutions can generate objects for each person in these different contexts, resulting in overlap, redundancy, and confusion. Person data modeling in this manner is limited and does not scale efficiently. The problems of data duplication and disambiguation continue to be a challenge in the existing CRM platforms. Various techniques have been offered, but they continue to be time consuming and do not scale efficiently.

BRIEF DESCRIPTION OF THE DRAWINGS

FIG. 1 shows an example environment for linking person records.

FIG. 2 depicts one implementation of a flowchart for linking person records.

FIG. 3 illustrates one implementation of linking person records in a database.

FIG. 4 illustrates one implementation of a flowchart for linking person records including an active record in a data set.

FIG. 5 illustrates one implementation of a life cycle management in linked person records in a database.

FIG. 6 illustrates one implementation of consultant object metadata.

FIGS. 7-8 illustrate user interfaces that can be used in an implementation for linking consultant object person records.

FIG. 9 illustrates one implementation of a flowchart for organizing linked person records.

FIG. 10 illustrates an implementation of an environment 1000 in which a person record linked by a person key may be used.

FIG. 11 is a block diagram of an example computer system for creating and linking person records in an on-demand services environment.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Examples of systems, apparatus, and methods according to the disclosed implementations are described in a sales context. The examples using sales personnel and sales life cycles are being provided solely to add context and aid in the understanding of the disclosed implementations. Other applications are possible, such that the following examples should not be taken as definitive or limiting either in scope, context or setting. It will thus be apparent to one skilled in the art that implementations can be practiced in or outside the sports query context.

The described subject matter is implemented by a computer-implemented system, such as a software-based system, a database system, a multi-tenant environment, or the like. Moreover, the described subject matter can be implemented in connection with two or more separate and distance computer-implemented systems that cooperate and communicate with one another. One or more implementations can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied. To simplify deployment, as well as reduce cost and complexity, on-demand services environments can re-imagine standard people objects, such as Leads and Contacts, to be relationships between the organization and the person. In this way, keeping track of the person through the customer lifecycle (e.g., marketing, sales, or service) will reduce confusion and can enable a platform de-duping strategy for people across these different types of objects to scale.

Introduction

The technology disclosed relates to representing users in different contexts within customer relationship management (CRM) environments. In particular, it relates to creating a person object model for each user in the CRM environment by linking a plurality of user records in the CRM environment that is separately created by different organizations and departments. The person object model also incorporates online social identities of the users, according to one implementation. This inclusive linked model provides a comprehensive view of the users to handlers of the CRM environment, thus facilitating an enhanced overall CRM experience.

In one example, "customer service" records, created by the customer service department of an organization, can maintain a history of services provided to the customers. Such records can identify the type of service provided to a customer, the identity of the customer, and the identity of the service agent. For instance, if a customer named "Matthew" contacts the technical support group of an organization like Salesforce.com®, his interaction with the technical support group is preserved in the "customer service" database of Salesforce.com. In contrast, "sales" records can track the sales made to the same customer and can include the identity of the customer and the sales agent. Using the previous example, if Matthew purchases one of the products of Salesforce.com®, his transaction is recorded in the "sales" database of Salesforce.com®. As a result, Salesforce.com® now has two entries of the same user, created by different departments at different instances. This leads to duplication of records in the CRM environment that integrates data from different departments and can result in erroneous inferences in the future by the handlers of the CRM environment.

Another feature of the technology disclosed allows organizations to efficiently organize person-related data. Examples of person records include a customer person record, an employee person record, or a social persona record. Social online identities of a person on different social networking sites like Facebook®, Twitter®, and LinkedIn®, can be mapped to one or more of these person records maintained by one or more different organizations. For example, a customer of Burberry® can create a customer community profile by logging into a social networking site such as Facebook® or Twitter®. Burberry® can then maintain a confidential person record for that customer within one or more on-demand services environments and link that customer person record with publicly available information in social media sites. In this way, Burberry® can retrieve information about the customer from various external sites, populating an internal and confidential person record, to provide and extrapolate more information about the customer. This allows Burberry® to manage the customer lifecycle seamlessly by using the person record for sales, service, and marketing.

An opportunity arises to efficiently handling in CRM environments that integrated multiple data warehouses and distributed systems by using an extensible person object model that links different instances of users across the multiple data warehouses and distributed systems. Enhanced user experience, employee satisfaction and retention, time and cost conservation may result.

Person Record Linking Environment

FIG. 1 shows an example environment 100 for linking person records. FIG. 1 shows that environment 100 can include user data store 102, person record store 105, social data store 108, network(s) 120, linking engine 122, active record engine 125, and mapping engine 128. In some implementations, the engines can be of varying types including workstations, servers, computing clusters, blade servers, server farms, or any other data processing systems or computing devices.

In some implementations, databases can store information from one or more tenants into tables of a common database image to form a multi-tenant database system (MTS). A database image can include one or more database objects. In other implementations, the databases can be relational database management systems (RDBMSs), object-oriented database management systems (OODBMSs), distributed file systems (DFS), no-schema database management systems, or any other data storing systems or computing devices.

User data store 102 holds business-to-business contacts that provide business information related to users such as names, addresses, job titles, industry types, territories, market segments, contact information, employer information, etc. In one implementation, user data store 102 can store web or database profiles of the users as a system of interlinked hypertext documents that can be accessed via the network 120 (e.g., the Internet). In another implementation, user data store 102 can also include standard profile information about leads, prospects and/or accounts. This standard profile information can be extracted from company websites, business registration sources such as Jigsaw, Hoovers™, or D&B, business intelligence sources, and/or social networking websites like Yelp®, Yellow Pages®, etc.

Person record store 105 contains person object records which can be searched in response to a user query for person records. At the user's option, the stored person records can be linked if the user believes they are the same person.

Social data store 108 stores social media content assembled from different types of data sources. Social media content can include information about social media sources, social accounts, social personas, social profiles, social handles, social feeds, feed items, content shared, posts, etc. In one implementation, social media content can add social context to the business-to-business contacts stored in user data store 102. Conversely, business-to-business contacts can add business context to the social personas or profiles according to some other implementations.

Regarding different types of data sources, access controlled application programing interfaces (APIs) like Yahoo Boss, Facebook Open Graph, Twitter Firehose can provide real-time search data aggregated from numerous social media sources such as LinkedIn®, Yahoo®, Facebook®, and Twitter®. APIs can initialize sorting, processing and normalization of data. Public internet can provide data from public sources such as first hand websites, blogs, web search aggregators, and social media aggregators. Social networking sites can provide data from social media sources such as Twitter®, Facebook®, LinkedIn®, and Klout®. In some implementations, the crawler can extract a list of persons from a master database (maintained by the online social platforms in some implementations) and search those persons on other person-related data sources to determine if additional social or web content associated with the persons exists in those sources. If the person-related data sources provide positive matches to any of the persons, the crawler can store the retrieved social or web content in a social data store 108 and business-to-business contacts, according to some implementations.

Furthermore, the social and business data can be accessed to specifically extract identities of the persons. In some implementations, core content of a web page or a social profile can be extracted using a text blocks analyzer that identifies HTML tags as delimiters of the web page. Useful basic structure of text fragments in separate text blocks can be extracted using a text blocks checker. In other implementations, a text blocks parser can identify text blocks that do not include text fragments and sequentially output the remaining text blocks as core contents of the web page. In some implementations, HTML delimiters such as <p>, <div>, <br>, <li>, <; hr>, and <pre>, etc. can be used for recognizing structure of the text blocks. Further, records with matching data can be filtered and their responsiveness can be compared against one another. Additionally, similarity scores can be assigned to the records based on the degree of responsiveness.

In some implementations, the responsiveness determination includes evaluating text in the records including alpha characters, numeric characters, alphanumeric characters, American Standard Code for Information Interchange (ASCII) characters, symbols, or foreign language unicode (e.g. UTF-8). In other implementations, other techniques can be used to identify similar records such as pattern matching, order matching, length matching, character type matching, sum matching, or other matching. One example of a match can be that a pattern of three characters appearing in a six character record must appear in the eight character record. Alternatively, the match can require that four characters appearing in consecutive order in a six character record must appear in the same consecutive order in an eight character record. Yet another match can be that the length of a first record must be the same as the length of a second record. A further match can be that alphanumeric characters appearing in certain positions of a first record must correspond to alphanumeric characters appearing in the same positions of another record, according to some implementations.

Linking engine 122 facilitates object to object linking between one or more person records. The records to be linked (linking candidates) are identified in response to a user query for data contained within a particular person record. The linking candidates are displayed to a user interface and the user has the option of specifying which records (if any) should be linked. In some implementations, manual disambiguation is used to address issues of redundancy that occur amongst duplicate records. In these instances, a user is prompted and asked whether the records are intended to be linked, and the records are linked only after receiving the user's instruction. In other implementations, the disambiguation is automatically addressed by the computer system. After the linking of records is completed, a comprehensive view of the linked candidate records is displayed to the user.

In yet other implementations, a unique person key is automatically created that identifies a collection of person record objects linked together, including the active record in the collection. In one implementation, the unique person key includes a string of unique characters that collectively correspond to a row of data values in a database.

Active record engine 125 automatically identifies which record within a group of records is an active record. In some implementations, an "active record" flag can indicate whether a record is active. In some implementations, active record engine 125 designates a record as active based on which record in a set, group or collection is found to have the most recent activity. In other implementations, active record engine 125 identifies the active record as the record which is the oldest or the record that has accumulated the largest amounts of data in comparison with the other records found in person record store 105. In yet other implementations, an active record can be identified by timestamp data relating to the creation date of the record, modification date of the record, or export data of the record. These criteria can be combined with each other and with additional criteria for selecting the active record in a set.

In another implementation, active records can be identified by one or more of the following variables with certain attributes: USER_ID being CHAR (15 BYTE), SOURCE_ID being CHAR (15 BYTE), OBJECT_ID being CHAR (15 BYTE), FIELD_ID being CHAR (15 BYTE), CREATED_BY being CHAR (15 BYTE), CREATED_DATE being DATE, MODIFIED_DATE being DATE, EXPORT_DATE being DATE, and DELETED being CHAR (1 BYTE).

Mapping engine 128 stratifies and augments linked object records according to one or more user-specified criteria such as "person" or "account." Once the different attributes, such as employee name, job function, work address, or job title, within the linked object records are identified, they can serve as a basis for further stratification of the linked object records. As shown in FIG. 7, places of business 616 of the linked records of a user named "Shannon Smith," including Genentech, UC Berkeley, and McKesson, are aggregated based on an "accounts" criteria, according to one implementation. Some other implementations can include stratifying the linked object records according to a "job activity" criterion 614, such that activities specified in the linked object records are separated and aggregated for easy access by the handler of the person handler.

Flowchart—Linking Person Records

FIG. 2 depicts one implementation of a flowchart for linking person records 200. For convenience, the flow charts described in this section are described with reference to assisting users, such as the example environment for linking person records illustrated in FIG. 1. It should be understood that other system elements can be used to implement the method and that the method discloses technology that is not necessarily tied to the system elements used for convenience of description. Moreover, some implementations will combine the steps described in the single steps or can split a single step into multiple steps. Some results can be either pre-calculated or calculated on demand.

At action 210, a plurality of stored person record object profiles stored in person record store 105 are accessed in response to a query issued by a handler of the person record.

At action 220, linking engine 122 identifies a plurality of similar person records from person record store 105 as linking candidates.

At action 230, linking engine 122 transmits data for display that lists the identified similar person records as candidates to be linked.

At action 240, linking engine 122 receives additional data specifying the linking among the candidate person-related records.

At action 250, linking engine 122 links the specified candidate person-related records to the first person-related record queried at action 210.

At action 260, person record store 105 receives a subsequent request for the first person-related record and retrieves the first person-related data set.

At action 270, linking engine 122 transmits data for displaying a comprehensive view of the linked person-related records and the first person-related record.

Linking Person Records

FIG. 3A illustrates one implementation of linking person records in a database. User interface 300A includes custom person objects 302A, 302B, 302C, and 302D. Each person object record 302A-302D is a separate node that contains data within a linked list data structure. At interface 300A, the linked list data is contact data which includes a user_id (not shown) and a source for the person object record. The user_id can include a 9-12 digit string of characters which can contain numbers, letters or a combination of numbers and letters as an alphanumeric string. Each time a new person object record is created, the user_id is established. A user_name may include a first name, middle initial, and last name. At interface 300A, the user_name is "Jason Wood". A query search of user_name "Jason Wood" returns person object records 302A-302D to the user at interface 300A. The source refers to the database which provides each custom person object record and in this example includes: Data.com (302A); salesforce.com/dreamforce (302B); Work.com (302C); and Data.com (302D). Each person object record is associated with or linked to person key 315. Person key 315 is a unique identifier containing a unique string of characters for a particular person that is used to group multiple person objects for that person. Each custom person object 302A-

302D can be manipulated by application programming interface functions such as share, create, read, update, and delete, as well as the ability to associate with other entities. Each custom person object 302A-302D can be connected or associated with any and all other person objects that represent the same person, such as person objects that contain matching user_names, at the user's direction.

Disambiguation is the process of removing ambiguities in a given set of data. At interface 300A, such ambiguity is found as there are several variations of "Jason Wood" which can also include "Jason A. Wood" and "Jason Wood, Jr.". In some implementations, a manual disambiguation is applied which is where a user for example would notice the three variations of Jason Wood, and make the decision that they are indeed the same individual, and manually provide input to the system asking to link the variations of "Jason Wood". In other implementations, disambiguation is done automatically by the computer system.

Data synchronization refers to propagating an update of one person record to other linked records that share the same person key 315. Person key 315 may be used to synchronize linked person object records in some implementations where the fields of the person object records are linked fields. For example, basic data such as name and Social Security Number are fields that could be suitable for linking. For linked fields, an edit applied to a particular field of one person object record is propagated to each linked record associated via the person key 315. The linked fields automatically share the update of the updated field. At interface 300B, although user_id "Jason Wood" belongs to two distinct divisions of Data.com—the Sales Division (302A) and the Customer Support Division (302D), a user can decide to link together both records. In this case, each record 302A and 302D will point to person key 315. Each person key 315 automatically points or links to the current active record 302A in the current example. This is also known as a "doubly-linked node", because one link occurs as the person object record points to the person key 315, and a second link occurs as the person key 315 links or points back to the person object record 302A. At interface 300B, person object record 302D is an inactive record and will remain both visible and accessible within the user interface despite being marked or depicted as being an inactive record. There are a number of ways to determine which person records are active. In one implementation, a comparison is done amongst all of the person records to determine which record has indications of the most recent activity. In another implementation, the active record can be identified as that record which is the oldest or has accumulated the largest amount of data.

Flowchart—Linking Person Records with an Active Record

FIG. 4 illustrates one implementation of a flowchart for linking person records including an active record in a data set 400.

At action 410, user data store 102 receives a request for a first person-related record from a user.

At action 420, using active record engine 125, one of the records in the set of person-related records is automatically designated as an active record.

At action 430, in response to the user request, the returned records are disambiguated.

At action 440, the disambiguated records are linked using linking engine 122.

At action 450, using active record engine 125, the active record is returned in response to the user query.

At action 460, using active record engine 125, users are enabled to navigate back and forth from the active record among other records within the data set.

Linking Person Records—Life Cycle Implementation

FIG. 5 illustrates one implementation 500 of a life cycle management in linked person records in a database. User interface 500 shows the overall progression or "life cycle" of a contact by viewing multiple person object records and optionally linking the records together. Three person object records 502A-502C are shown. Each individual person object record 502A-502C is a separate node which includes a user_id (not shown), user_name, and a source for the person object record. Each person object record 502A-502C represents a node within a linked list data structure. At interface 500, each person object record 502A-502C is linked to and therefore points to the same person key 515. The user_name is "Steve Smith". The source for each custom person object record can include a database that supplied the record and at interface 500 includes Company A (502A); Company B (502B) and Company C (502C). Person key 515 is a primary or unique key containing a string of unique characters which collectively correspond to a row of data values in a database table. In 502A, Steve Smith is a Lead employed by Company A. In this context, a Lead is a new contact who is interested in a company. Often, a relationship established with a new Lead can result in a sale. The Lead will be saved into the database system for future use. In 502B, Steve Smith is a Sales Contact at Company B. In 502C, Steve Smith is a user-employee who now works at Company C and has employee access to the database system.

Conversion of one record type to generate another record type can cause creation of a conversion trail. Some implementations include linking the pre and post transformation record versions to a single person key, such as person key 515. In one example, if a record advances from being a lead to an account, then the attributes of the record, both as lead and as account, are stored and accessible via the common person key 515. In another example, if a record is converted from being a portal user to a contact, common person key 515 can be used to link and reference the pre conversion and post conversion formats.

Linking multiple person records together using person key 515 allows a user to conveniently access a plurality of records associated with a particular person. In some implementations, as an individual grows and changes during their career span, the linked records provide the user with a sales life cycle overview that illustrates the career progression. For example, as each of Steve Smith's person records (502A-502C) is linked to the same person key 515, the career life cycle of Steve Smith is captured as he begins his career as a Sales Lead, then progresses to a Sales Contact, and finally he becomes a user-employee. Person key 515 is associated with each of the linked person records 502A-502C. The person key 515 is used to link old and new objects.

Interface 500 shows a second arrow which "points back" from person key 515 to person object record 502C which indicates that person object record 502C is the active record among the set of records shown in 502A-502C. Person object records 502A and 502B are inactive records which will still remain visible and accessible to the user. A user is therefore able to organically create a resume or history as the contact Steve Smith evolves and moves around throughout his career. Trust is not an issue in this instance because the company already owns any and all data which can potentially be linked by a user. Such a system enables a user to perform a better overall job of CRM. For example, at Company C where Steve Smith is a user, it can be discovered that he experienced a number of customer support issues, some of which remain unresolved. When a user links together each of Steve Smith's person records (502A-502C), visibility of Steve Smith's problems at Company C is gained of which they were previously unaware of By having such data, a user can make a better-informed decision as to how to approach Steve Smith. In this instance, where there are outstanding customer support issues, it would be prudent not only for the user to attempt resolving such issues, but it would also be a bad time for individuals from the user's organization to approach Steve Smith in an attempt to sell him additional products or services until such issues are resolved. In other implementations, conversion is applied wherein multiple person records are associated with the same person key.

Consultant Object Record—Metadata

FIG. 6 illustrates one implementation of consultant object metadata 600. FIG. 6 shows that metadata 600 can include consultant object 602, social object 608, opportunities 610, and company objects 604 and 606. Consultant object 602 includes metadata 603 such as the company name, company type, company location, social object, and opportunities. Consultant object 602 maps to company object 604, company object 606, social object 608, and opportunities 610 using a mapping table (not shown) resulting in a many to many relationship between each of the objects shown. Likewise, company objects 604 and 606, social object 608, and opportunities 610 each map to the consultant object 602 using a many to many relationship. Social object 608 contains metadata 609 which many include an email, tweet, or blog posting. Opportunities 610 contains metadata 611 and can include information pertaining to the details of a particular opportunity such as the company involved, a lead or contact person at the company, and information about the service or goods. Company objects 604 and 606 each contain metadata 605 and 607 respectively which describe the company location as well as basic information about the company such as industry type.

User Interfaces for Consultant Records

FIGS. 7-8 illustrate user interfaces that can be used in an implementation for linking consultant person object records. FIG. 7 illustrates a user interface 700, of one implementation of consultant records depicted in a table view. Title block 701 indicates that "Shannon Smith" is a Researcher affiliated with the company Genentech, and is therefore the subject of a user query. In column 712, the details for Shannon Smith's person object record are depicted and include FirstName and LastName; Title; Email, Contact Phone; Number of days since last activity; person key; and Mailing Address. Column 716, lists the accounts for which Shannon Smith is associated: Genentech, UC Berkeley, and McKesson. Column 718 is a list of roles associated with Shannon Smith, and indicates Shannon Smith's role or title at each account, but also indicates to the user which records are inactive or active (primary). User interface 700 also summarizes a log of activities involving Shannon Smith in column 722. The activity log includes date and time information for phone calls placed and received, as well as emails and Tweets that are associated with Shannon's Smith's person records. Opportunities are captured in 720, and are based on the linked records for Shannon Smith. For example, sales opportunities involving lab equipment (such as MRI scanners for Sample Fridges) that can be needed or required at Genentech is conveniently summarized and readily available to any user on demand.

FIG. 8 illustrates one implementation of consultant records depicted in an aggregate view. In this example, user Shannon Smith is a person who is associated with three separate accounts—Genentech, UC Berkeley, and McKesson. User interface 800 depicts a view of object records aggregated by account. In 806, the Genentech account includes location information as well as a contact person 808 "Michael Williams", a Procurement Lead and further includes sales opportunity data 802 and 810 which both indicate potential sales leads for lab equipment such as Sample Fridges and MRI Scanners. Shannon Smith is also linked to McKesson 828, for which contact lead 836 Lisa Jones is included, as well as a related email at 848 for which lab equipment is discussed. Finally, at 822, Shannon Smith is linked to UC Berkeley's Molecular and Cell Biology Department for which professors Elizabeth Johnson and John Cannin are linked at 812 and 832.

Flowchart—Organizing Linked Person Records

FIG. 9 illustrates one implementation of a flowchart for organizing linked person records 900.

At action 910, person record store 105 accesses a plurality of stored linked person record object profiles from a database.

At action 920, person record store 105 receives user criteria about displaying the linked person-related records.

At action 930, active record engine 125 automatically designates one of the records in the plurality of person-related records as a selected record.

At action 940, mapping engine 128 displays data on a user interface from the remaining records in the plurality of person-related records in relationship to the selected record designated by the mapping engine 128.

Person Record Environment

FIG. 10 illustrates an implementation of an environment 1000 in which a person record linked by a person key may be used. Person record 1025 is a currently active person object record within a set of person object records which is associated with a person key. Person record 1025 can be used as a solo credential to access a plurality of applications. For example, if a user has provisioned an account with one of the many applications and services provide by Salesforce.com®, the user can use that account to access the different applications 1010 hosted by Saleforce.com® such as Marketing Cloud, Sales Cloud, Service Cloud, Chatter, and Work.com, without being required to provide additional login information or create separate accounts in order to access the different applications 1010.

In some implementations, multiple social profiles and personas and different enterprise accounts of a user can also be linked to a unique and solo person record. For instance, data layer 1020 includes social trust data imported from a contacts repository like Data.com® and also includes external data connectors, such as Salesforce.com's Radian-6™, that supply social data 1055 from various social networking environments like LinkedIn®, Facebook®, Twitter®, Chatter, or Work.com. As shown in FIG. 10, both data layer 1020 and social data layer 1055 are linked to person record 1025, thus maintaining a comprehensive trail of a user's identities, activities, and other progressions during a sales cycle.

In yet other implementations, person record 1025 can also be linked to enterprise data 1027 originating from a variety of departments and sources within an organization, including information technology (IT), marketing, or enterprise resource planning (ERP). CRM Data 1037 of a user such as activities, opportunities, cases, and files can be associated to the person record 1025, as described above in this application. Other miscellaneous data can also be linked to the person record 1025, such as a user's customer support history captured by a helpdesk software like Salesforce.com's Desk.com or a collaborative efforts trail maintained by a meeting productivity software like Salesforce.com's Do.com.

Computer System

FIG. 11 is a block diagram of an example computer system 1100 to construct social feed filters using collaborative filtering. FIG. 11 is a block diagram of an example computer system, according to one implementation. Computer system 1110 typically includes at least one processor 1114 that communicates with a number of peripheral devices via bus subsystem 1112. These peripheral devices can include a storage subsystem 1124 including, for example, memory devices and a file storage subsystem, user interface input devices 1122, user interface output devices 1120, and a network interface subsystem 1116. The input and output devices allow user interaction with computer system 1110. Network interface subsystem 1116 provides an interface to outside networks, including an interface to corresponding interface devices in other computer systems.

User interface input devices 1122 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1110.

User interface output devices 1120 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1110 to the user or to another machine or computer system.

Storage subsystem 1124 stores programming and data constructs that provide the functionality of some or all of the modules and methods described herein. These software modules are generally executed by processor 1114 alone or in combination with other processors.

Memory 1126 used in the storage subsystem can include a number of memories including a main random access memory (RAM) 1134 for storage of instructions and data during program execution and a read only memory (ROM) 1132 in which fixed instructions are stored. A file storage subsystem 1128 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1128 in the storage subsystem 1124, or in other machines accessible by the processor.

Bus subsystem 1112 provides a mechanism for letting the various components and subsystems of computer system 1110 communicate with each other as intended. Although bus subsystem 1112 is shown schematically as a single bus, alternative implementations of the bus subsystem can use multiple busses.

Computer system 1110 can be of varying types including a workstation, server, computing cluster, blade server, server farm, or any other data processing system or computing device. Due to the ever-changing nature of computers and networks, the description of computer system 1110 depicted in FIG. 11 is intended only as one example. Many other configurations of computer system 1110 are possible having more or fewer components than the computer system depicted in FIG. 11.

The features disclosed herein can be implemented on many different types of systems. However, the examples herein are described with a focus on an on-demand services environment. A multi-tenant database system, such as SALESFORCE.COM, is one example of an on-demand services environment. Other database systems, such as WORK.COM (formerly Rypple), DATA.COM, marketing automation services, such as MARKETING CLOUD (including radian6, ExactTarget, and BuddyMedia), as well as enterprise social networks, such as CHATTER COMMUNITIES, are other examples of on-demand services environments.

Particular Implementations

In one implementation, the technology disclosed includes a method of resolving uncoordinated person-related records in a database. The method includes receiving a query for records for a first person from a database in which multiple users in multiple departments created uncoordinated person-related records for respective business processes. The method also includes identifying a plurality of similar person records as candidate person-related records for the first person, wherein the identified similar person records include at least some matching data. The method further includes transmitting data for display that lists the candidate person-related records. The method further includes receiving user data specifying linking among the candidate person-related records. The method further includes linking the specified candidate person-related records using a unique person identifier to create a first person-related set.

This method and other implementations of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method further includes receiving a subsequent request for the first person-related set. The method further includes transmitting responsive data for display that lists a plurality of the linked candidate person-related records in the first person-related set.

The method further includes controls for linking together the candidate person-related records including resolving similarities within the linked candidate person-related records.

The method further includes resolving the similarities using user input.

The method further includes transmitting additional data for displaying a comprehensive view further including organizing the additional data into a continuous chronological format.

The method further includes linking the candidate person-related records including stratifying and augmenting the candidate person-related records based on user-specified criteria.

The method further includes user-specified criteria that include a person, account, or job activity.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method is described for navigating a set of person-related records in a database wherein each record includes a pointer to a unique key in a database table. The method includes receiving a query for records for a first person from a database in which multiple users in multiple departments created uncoordinated person-related records for respective business processes. The method also includes designating automatically one of the records in a set of person-related records for a first person as an active record wherein each record in the set is associated with a person key that indicates which record in the set of person-related records is the active record. The method also includes returning the active record in response to the query for the first person-related record and enabling users to navigate from the active record to other records in the set.

The method further includes an active record which is designated as an active record based on the most recent account activity in comparison with the remaining records in the set of person-related records.

The method further includes an active record which is the oldest record found within the set of person-related records.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a system of resolving uncoordinated person-related records in a database is described. The system includes a processor coupled to memory and memory containing computer instructions that, when executed, cause the processor to receive a query for records for a first person from a database in which multiple people in multiple departments created uncoordinated person-related records for respective business processes. The instructions further cause the processor to identify a plurality of similar person records as candidate person-related records for the first person, wherein the identified similar person records include at least some matching data. The instructions further cause the processor to transmit data for display that lists the candidate person-related records. The instructions further cause the processor to receive user data specifying linking among the candidate person-related records. The instructions further cause the processor to link the specified candidate person-related records using a unique person identifier to create a first person-related set. The instructions further cause the processor to receive a subsequent request for the first person and retrieve the first person-related set. The instructions further cause the processor to transmit responsive data for display that lists a plurality of the linked candidate person-related records in the first person-related record.

This method and other implementations of the technology disclosed can include one or more of the following features and/or features described in connection with additional methods disclosed.

The instructions further cause the processor to link together the candidate person-related records including resolving similarities within the linked candidate person-related records.

The instructions further cause the processor to resolve similarities using user input.

The instructions further cause the processor to transmit additional data for displaying a comprehensive view which includes organizing the additional data into a continuous chronological format.

The instructions further cause the processor to utilize stratification and augmentation of the candidate person-related records based on user-specified criteria.

The instructions further cause the processor to include person, account, or job activity for the user-specified criteria.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

In another implementation, a method is described for resolving uncoordinated person-related records in a database. The method includes receiving a query for records for a first person from a database in which multiple people in multiple departments created uncoordinated person-related records for respective business processes. The method also includes identifying a plurality of similar person records as specified candidate person-related records for the first person, wherein the identified similar person records include at least some matching data. The method further includes receiving human feedback on the specified candidate person-related records and linking the candidate person-specific records based on the human feedback and representing the linked person-related records using a unique person identifier.

This method and other implementations of the technology disclosed can include one or more of the following features and/or features described in connection with additional methods disclosed.

The method further includes transmitting additional data for displaying a comprehensive view of the linked person-related records.

The method further includes displaying a comprehensive view including organizing the additional data into a continuous chronological format.

The method further includes stratifying and augmenting the candidate person-related records based on user-specified criteria.

Other implementations can include a non-transitory computer readable storage medium storing instructions executable by a processor to perform any of the methods described above. Yet another implementation can include a system including memory and one or more processors operable to execute instructions, stored in the memory, to perform any of the methods described above.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of resolving uncoordinated person objects and person-related objects in a database, the method including:
   receiving a query directed to a first person for objects stored in a database, in which multiple users in multiple departments created uncoordinated person objects that do not share a common key, and in which the person objects are linked to person-related objects;
   identifying a plurality of candidate person objects responsive to the query for the first person, wherein the identified candidate person objects share at least some matching data;
   transmitting data for display to a user that lists the candidate person objects;
   receiving data from the user specifying linking among the candidate person objects;
   linking the specified candidate person objects to a coordinating customer relations management (CRM) object using a system-generated unique person identifier as a common key and preserving linkage to respective person-related objects associated with the specified candidate person objects, thereby creating a first person-related set;
   identifying one of the person objects in the first person-related set as a lead active person object;
   receiving a subsequent request for CRM data related to the first person, retrieving the coordinating CRM object, and using the links from the coordinating CRM object to at least some coordinated person objects in the first person-related set; and
   transmitting responsive data for display that lists data from the coordinated person objects, featuring data from the lead active person object.

2. The method of claim 1, wherein the lead active person object is identified based on most recent account activity in the first person-related set.

3. The method of claim 1, wherein the lead active person object is identified as an oldest person object in the first person-related set.

4. The method of claim 1, wherein the coordinating CRM object and person objects that share the unique person identifier are doubly-linked by pointers.

5. The method of claim 1, further including transmitting responsive data for display that includes data from person-related objects for companies and opportunities associated with the first-person related set.

6. The method of claim 1, further including transmitting responsive data for display that includes data from person-related objects for companies and user activities associated with the first-person related set.

7. The method of claim 1, further including transmitting responsive data for display that includes data from person-related objects for companies associated with the first-person r elated set.

8. A system that resolves uncoordinated person objects and person-related objects in a database, the system including:
   a processor, memory coupled to the processor, and program instructions loaded in the memory that, when executed on the processor, cause the processor to carry out steps of:
   receiving a query directed to a first person for objects stored in a database, in which multiple users in multiple departments created uncoordinated person objects that do not share a common key, and in which the person objects are linked to person-related objects;
   identifying a plurality of candidate person objects responsive to the query for the first person, wherein the identified candidate person objects share at least some matching data;
   transmitting data for display to a user that lists the candidate person objects;
   receiving data from the user specifying linking among the candidate person objects;
   linking the specified candidate person objects to a coordinating customer relations management (CRM) object using a system-generated unique person identifier as a common key and preserving linkage to respective person-related objects associated with the specified candidate person objects, thereby creating a first person-related set;
   identifying one of the person objects in the first person-related set as a lead active person object;
   receiving a subsequent request for CRM data related to the first person, retrieving the coordinating CRM object and using the links from the coordinating CRM object to at least some coordinated person objects in the first person-related set; and
   transmitting responsive data for display that lists data from the coordinated person objects, featuring data from the lead active person object.

9. The system of claim 8, wherein the lead active person object is identified based on most recent account activity in the first person-related set.

10. The system of claim 8, wherein the lead active person object is identified as an oldest person object in the first person-related set.

11. The system of claim 8, wherein the coordinating CRM object and person objects that share the unique person identifier are doubly-linked by pointers.

12. The system of claim 8, further including transmitting responsive data for display that includes data from person-related objects for companies and opportunities associated with the first-person related set.

13. The system of claim 8, further including transmitting responsive data for display that includes data from person-related objects for companies and user activities associated with the first-person related set.

14. The system of claim 8, further including transmitting responsive data for display that includes data from person-related objects for companies associated with the first-person related set.

15. A non-transitory computer readable medium with program instructions loaded therein that, when executed on the processor, cause the processor to carry out steps of:
   receiving a query directed to a first person for objects stored in a database, in which multiple users in multiple departments created uncoordinated person objects that do not share a common key, and in which the person objects are linked to person-related objects;
   identifying a plurality of candidate person objects responsive to the query for the first person, wherein the identified candidate person objects share at least some matching data;
   transmitting data for display to a user that lists the candidate person objects;
   receiving data from the user specifying linking among the candidate person objects;
   linking the specified candidate person objects to a coordinating customer relations management (CRM) object using a system-generated unique person identifier as a common key and preserving linkage to respective person-related objects associated with the specified candidate person objects, thereby creating a first person-related set;

identifying one of the person objects in the first person-related set as a lead active person object;

receiving a subsequent request for CRM data related to the first person, retrieving the coordinating CRM object, and using the links from the coordinating CRM object to at least some coordinated person objects in the first person-related set; and transmitting responsive data for display that lists data from the coordinated person objects, featuring data from the lead active person object.

16. The non-transitory computer readable medium with program instructions of claim 15, wherein the lead active person object is identified based on most recent account activity in the first person-related set.

17. The non-transitory computer readable medium with program instructions of claim 15, wherein the lead active person object is identified as an oldest person object in the first person-related set.

18. The non-transitory computer readable medium with program instructions of claim 15, wherein the linked coordinating CRM object and person objects that share the unique person identifier are doubly-linked by pointers.

19. The non-transitory computer readable medium with program instructions of claim 15, further including instructions that implement transmitting responsive data for display that includes data from person-related objects for companies and opportunities associated with the first-person related set.

20. The non-transitory computer readable medium with program instructions of claim 15, further including instructions that implement transmitting responsive data for display that includes data from person-related objects for companies and user activities associated with the first-person related set.

* * * * *